(12) United States Patent
Umeda et al.

(10) Patent No.: US 6,400,390 B1
(45) Date of Patent: Jun. 4, 2002

(54) IMAGE RECORDING METHOD AND APPARATUS WITH A BEAM INCIDENT ANGLE CHANGING DEVICE

(75) Inventors: Toshikazu Umeda; Yasuaki Tamakoshi, both of Sayama (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/584,547

(22) Filed: May 31, 2000

(30) Foreign Application Priority Data

Jun. 4, 1999 (JP) .......................................... 11-157661

(51) Int. Cl.⁷ ............................................... B41J 15/14
(52) U.S. Cl. ...................................... 347/241; 347/256
(58) Field of Search ................................. 347/233, 239, 347/243, 241, 255; 359/320, 305, 312; 430/240, 264

(56) References Cited

U.S. PATENT DOCUMENTS

| 4,312,588 | A | * | 1/1982 | Minoura et al. ............ 347/243 |
| 4,321,564 | A | * | 3/1982 | Tregay ........................ 359/320 |
| 4,686,542 | A | * | 8/1987 | Yip et al. .................... 347/239 |
| 4,711,838 | A | | 12/1987 | Grzeskowiak et al. ...... 430/568 |
| 4,920,034 | A | * | 4/1990 | Sasaoka et al. ............. 430/264 |
| 5,783,356 | A | * | 7/1998 | Bosschaerts et al. ........ 430/240 |

FOREIGN PATENT DOCUMENTS

JP        10-500229       1/1998

* cited by examiner

Primary Examiner—Hai Pham
(74) Attorney, Agent, or Firm—Frishauf, Holtz, Goodman, Langer & Chick, P.C.

(57) ABSTRACT

An image recording apparatus having a laser beam source which emits a laser beam, and an incident angle changing device for changing an incident angle, in a sub scanning direction of the laser beam emitted from the laser beam source, onto a light sensitive material. The incident angle changing device changes the incident angle of the laser beam emitted from the laser beam source on the light sensitive material from $\theta 1$ to $\theta 2$. The incident angle $\theta 1$, an incident angle $\theta 1'$ at which the laser beam is incident at the incident angle $\theta 1$ on the light sensitive material, is incident in the light sensitive material. The incident angle $\theta 2$, an incident angle $\theta 2'$ at which the laser beam is incident at the incident angle $\theta 2$ on the light sensitive material, is incident in the light sensitive material. One of integers N satisfies the following formula:

$$(N+0.5-(0.7/\gamma))<(2nh/\lambda)(\cos\theta 1'-\cos\theta 2')<(N+0.5+(0.7/\gamma))$$

where, n denotes a refractive index of the light sensitive material, h denotes a thickness of the light sensitive material, $\lambda$ denotes a wavelength of the laser beam and $\gamma$ is a gamma value of the light sensitive material.

30 Claims, 14 Drawing Sheets

IMAGE RECORDING METHOD AND APPARATUS WITH A BEAM INCIDENT ANGLE CHANGING DEVICE

BACKGROUND OF THE INVENTION

This invention relates to an image recording method and to an image recording apparatus.

Heretofore, in order to record an image on the basis of image data, a silver halide photographic material is exposed to a laser beam. Further, in recent years, it has appeared a thermally developable silver halide photosensitive material which is capable of visualizing an image by thermal development without using a liquid process. However, it has been proved that, if it is exposed to a laser beam, interference fringes are generated to produce unevenness of image. This phenomenon will be explained with reference to FIG. 15 which is a conceptional drawing showing the relation between the cross-section of a film and a laser beam.

As shown in FIG. 15(*a*), when a laser beam enters the film F, which is composed of a photosensitive layer of a thermally developable silver halide photosensitive material and a supporting member made of a PET film or the like, from its obverse surface F1, owing to a part of the beam being reflected by the reverse surface F2 and returns to the obverse surface F1, interference occurs between the beam B1 which directly enters the photosensitive layer and the beam B2 which is transmitted through the photosensitive layer, reflected by the surface F2 and further reflected by the obverse surface F1. For this reason, the light quantity which is applied to the photosensitive layer varies depending on the thickness of the film, and as a result of it, the amount of exposure for the thermally developable silver halide photosensitive material varies, to produce unevenness of density.

If the optical path difference δ between the beam directly entering the photosensitive layer and the beam passing through the photosensitive layer after being reflected by the surfaces F2 and F1 is an integral multiple of the wavelength of the laser beam, the light quantity applied to the photosensitive layer becomes maximum, and if it is shifted by a half of the wavelength, the light quantity becomes minimum. The reflectance R at the boundary surface between two media having different refractive indices is expressed by the following equation (1):

$$R=((nB-nA)/(nB+nA))^2 \qquad (1),$$

where nA and nB denote the refractive indices of the media being present at the both sides of this boundary surface respectively.

Now, for example, assuming that the refractive indices of the respective layers of the photosensitive material are the same and uniform, and that nA=1 (air) and nB=1.5 (photosensitive material), the reflectance R at the boundary surface between air and the photosensitive layer is 4%. Further, the variation of light quantity (peak to peak) ΔA owing to interference can be expressed by the following equation (2), reaching a large value of 16%:

$$\Delta A = 4R \qquad (2).$$

Actually, as shown in FIG. 15(*b*), the variation of light quantity owing to interference becomes less than the above-described value, because a laser beam absorption layer is provided at the rear side of the reverse surface F2 and scattered light s is generated by the silver halide particles included in the photosensitive layer. However, if there is a slight difference of refractive index between the absorption layer and the photosensitive layer, reflection occurs at the boundary surface F2 of the absorption layer and the supporting member, to make the absorption layer not to contribute to the reduction of interference. Further, because the conventional photosensitive materials have large sized silver halide particles included, and are capable of being provided with multiple absorption layers, interference fringes are difficult to be generated in them, while a thermally developable photosensitive material has finer silver halide particles than the conventional photosensitive materials, and the light scattering in the photosensitive layer is much less than the conventional films, hence, interference becomes remarkable especially in the case of a high-contrast thermally developable photosensitive material having a γ value (film contrast) of 2 or more.

It is possible to prevent the variation of light quantity owing to interference as described in the above by the countermeasures (a) to (c) as follows:

(a) By providing a reflection reducing film on the reverse surface of the supporting member (F2), the reflectance by the boundary surface F2 between the supporting member and the absorption layer is reduced.

(b) The dispersion of the thickness of the supporting member is suppressed to a fraction one over several or less of the wavelength of the laser beam (generally 0.5 to 1.5 μm).

(c) By making smaller the difference of refractive index between the supporting member and the absorption layer, the reflectance R at the boundary surface F2 between the supporting member and the absorption layer is made smaller.

However, the countermeasure (a) results in the raise of cost, and is not favorable. Further, concerning the countermeasure (b), it is possible to suppress the dispersion of the medium having a thickness of several μm, but it is nearly impossible to suppress the dispersion of the medium having a thickness of 100 μm or more to a value under 1 μm or smaller. Furthermore, regarding the countermeasure (c) too, because even a difference of refractive index of only 0.05 or smaller makes interference fringes, it is nearly impossible to adjust the difference of the refractive index between the both members to a value under this level.

Further, in the description of the U.S. Pat. No. 4,711,838, it is disclosed a thermally developable silver halide photosensitive material comprising a surface layer diffusing and transmitting the near infrared light which is in the wavelength region of a laser beam, a reverse surface layer diffuse-reflecting or absorbing this near infrared light, and a layer which is provided between the supporting member and the photosensitive layer and diffuse-transmits or absorbs this near infrared light. Heretofore, it is general to suppress interference fringes by devising the photosensitive material itself as described in the above. Further, in the publication of the TOKUHYOHEI 10-500229, it is disclosed that a laser diode is driven by an input signal for the laser diode to which a high-frequency signal is superposed.

However suppression of interference fringes by devising the photosensitive material gives a bad influence to other characteristics of the photosensitive material, for example, visibility after development and cost of the photosensitive material, or it is not sufficient by itself alone as the countermeasure. Further, the superposing of a high-frequency signal to the input signal for the laser diode is technically difficult, makes cost high, and possibly makes the operation all the more unstable, and further, it has the defect that it makes the efficiency of utilizing light about a half. Furthermore, in a high-contrast photosensitive material having a γ value of 2 or larger, the suppression of interference fringes has not been made enough.

SUMMARY OF THE INVENTION

This invention has been made in view of the above-described problems in the conventional technology; it is an object of this invention to provide an image recording method and an image recording apparatus capable of improving the quality of an image which is formed on a photosensitive material, by reducing the interference fringes of the laser beam by a method which is different from conventional ones.

In order to accomplish the above-described subjects, the image recording method of this invention is an image recording method in which an image is formed on a thermally developable silver halide photosensitive material by making a scanning exposure to a laser beam for said photosensitive material, which has a photosensitive layer including a silver salt of an organic acid and silver halide particles having an average particle size of 0.1 μm or smaller provided on a supporting member having a thickness of 200 μm or smaller, has the transmittance for the laser beam which is 20% or larger at the mean wavelength of the laser beam, and has a γ value of 2 or larger, wherein said photosensitive material is subjected to exposure with an incident angle of the laser beam to said photosensitive material switched over from θ1 to θ2 at every predetermined number of scan lines in order that some integer N may satisfy the following expression:

$$(N+0.5-(0.7/\gamma))<(2nh/\lambda)(\cos\theta1'-\cos\theta2')<(N+0.5+(0.7/\gamma)) \quad (3),$$

where N denotes an integer, n denotes the refractive index of the photosensitive material, h denotes the thickness of the photosensitive material, λ denotes the wavelength of the laser beam, θ1' denotes the incident angle in the photosensitive layer of the laser beam which is incident at the incident angle θ1, and θ2' denotes the incident angle in the photosensitive layer of the laser beam which is incident at the incident angle θ2.

According to this invention, even for a high-contrast thermally developable silver halide photosensitive material having a γ value of 2 or larger, interference fringes can be effectively reduced. Besides, for more effective reduction of interference fringes, it is desirable that an integer N satisfies the following expression (4):

$$(N+0.5-(0.4/\gamma))<(2nh/\lambda)(\cos\theta1'-\cos\theta2')<(N+0.5+(0.4/\gamma)) \quad (4).$$

Further, the image recording method according to another embodiment of this invention is an image recording method in which an image is formed on a thermally developable silver halide photosensitive material by making a scanning exposure to a laser beam for said photosensitive material which has a photosensitive layer including a silver salt of an organic acid and silver halide particles having an average diameter of 0.1 μm or smaller provided on a supporting member having a thickness of 200 μm or smaller, has the transmittance for the laser beam which is 20% or larger at the mean wavelength of the laser beam, and has a γ value of 2 or larger, wherein the incident angle of said laser beam to a pixel of said photosensitive material is different from that to a pixel adjacent to said pixel.

Further, the image recording method according to further embodiment of this invention is an image recording method in which an image is formed on a thermally developable silver halide photosensitive material by making a scanning exposure to a plurality of laser beams which scan substantially different scan lines from one another on said photosensitive material which has a photosensitive layer including a silver salt of an organic acid and silver halide particles having an average diameter of 0.1 μm or smaller provided on a supporting member having a thickness of 200 μm or smaller, has the transmittance for the laser beam which is 20% or larger at the mean wavelength of the laser beam, and has a γ value of 2 or larger, wherein each of at least two laser beams of said plurality of laser beams has an incident angle to a pixel of said photosensitive material which is different from that to a pixel adjacent to said pixel.

Further, the method of image recording according to another embodiment of this invention is an image recording method in which an image is formed on a thermally developable silver halide photosensitive material by making a scanning exposure to a plurality of laser beams which scan the substantially same scan line on said photosensitive material which has a photosensitive layer including a silver salt of an organic acid and silver halide particles having an average diameter of 0.1 μm or smaller provided on a supporting member having a thickness of 200 μm or smaller, has the transmittance for the laser beam which is 20% or larger at the mean wavelength of the laser beam, and has a γ value of 2 or larger, wherein at least two laser beams of said plurality of laser beams have respectively different incident angles to the same pixel of said photosensitive material.

Further, the image recording method according to a further another embodiment of this invention is an image recording method in which an image is formed on a thermally developable silver halide photosensitive material by making a scanning exposure to a laser beam for said photosensitive material, which has a photosensitive layer including a silver salt of an organic acid and silver halide particles having an average diameter of 0.1 μm or smaller provided on a supporting member having a thickness of 200 μm or smaller, has the transmittance for the laser beam which is 20% or larger at the mean wavelength of the laser beam, and has a γ value of 2 or larger, wherein a laser beam is split into a plurality of beams, said photosensitive material is subjected to a scanning exposure to the plural laser beams obtained by splitting, and at least two laser beams of said plural laser beams obtained by splitting scan substantially the same scan line for exposure and have respectively different incident angles to the same pixel of said photosensitive material.

Further, the image recording method according to a further another embodiment of this invention is an image recording method in which an image is formed on a thermally developable silver halide photosensitive material by making a scanning exposure to a laser beam for said photosensitive material, which has a photosensitive layer including a silver salt of an organic acid and silver halide particles having an average diameter of 0.1 μm or smaller provided on a supporting member having a thickness of 200 μm or smaller, has the transmittance for the laser beam which is 20% or larger at the mean wavelength of the laser beam, and has a γ value of 2 or larger, wherein the laser beam is split into a plurality of beams, said photosensitive material is subjected to a scanning exposure to the plural laser beams obtained by splitting, and each of at least two laser beams of said plural laser beams obtained by splitting has an incident angle to a pixel of said photosensitive material which is different from that to a pixel adjacent to said pixel.

According to each of the above-described image recording methods, even for a high-contrast thermally developable silver halide photosensitive material having a γ value of 2 or more, interference fringes can be effectively reduced.

Further, it is desirable that the aforesaid photosensitive material includes a silver salt of an organic acid of an amount of 4 times in terms of silver quantity to the silver halide particles in the aforesaid photosensitive layer. If a silver salt of an organic acid of an amount of 4 times in terms of silver quantity to the silver halide particles in the photosensitive layer is included, the photosensitive material has a high visibility after development, to have the contrast easily made high, but interference fringes can be effectively reduced.

The source of the aforesaid laser beam can be made a laser diode.

Further, the image recording apparatus of this invention is an image recording apparatus forming an image on a thermally developable silver halide photosensitive material by making a scanning exposure to a laser beam for said photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or larger, comprising a laser light source for emitting a laser beam, and an incident angle changing means for switching over the incident angle of said laser beam to said photosensitive material at every predetermined number of scan lines.

According to this invention, interference fringes can be reduced even for a high-contrast thermally developable silver halide photosensitive material having a $\gamma$ value of 2 or more. In this case, the above-described incident angle changing means is equipped with a light modulating element for varying the emerging angle of said laser beam, and by controlling the driving of this light modulating element, the incident angle can be switched over.

Further, the image recording apparatus of another embodiment of this invention is an image recording apparatus forming an image on a thermally developable silver halide photosensitive material by making a scanning exposure to a laser beam for said photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or more, comprising a laser light source for emitting a laser beam, a light splitting means for splitting said laser beam into a plurality of laser beams, and an optical system having such a structure as to make different the incident angles of said plurality of laser beams to said photosensitive material from one another.

Further, the image recording apparatus of further another embodiment of this invention is an image recording apparatus forming an image on a thermally developable silver halide photosensitive material by making a scanning exposure to a laser beam for said photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or larger, comprising a plurality of laser light sources for emitting a laser beam, and an optical system having such a structure as to make different the incident angles of a plurality of laser beams to said photosensitive material from one another.

Further, the image recording apparatus of another embodiment of this invention is an image recording apparatus forming an image on a thermally developable silver halide photosensitive material by making a scanning exposure to a plurality of laser beams which scan substantially different scan lines from one another on said photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or larger, comprising a plurality of laser light sources for emitting a laser beam, a light splitting means for splitting said laser beam into a plurality of laser beams, and an optical system having such a structure as to make different the incident angles of at least two laser beams of said plurality of laser beams to said photosensitive material from one another.

Further, the image recording apparatus of further another embodiment of this invention is an image recording apparatus forming an image on a thermally developable silver halide photosensitive material by making a scanning exposure to a laser beam for said photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or larger, comprising a laser light source for emitting a laser beam, and a light splitting means for splitting said laser beam into a plurality of laser beams, wherein at least two laser beams of said plurality of laser beams scan substantially the same scan line for exposure and have different incident angles to said photosensitive material respectively.

According to each of the above-described image recording apparatus, interference fringes can be reduced even for a high-contrast thermally developable silver halide photosensitive material having a $\gamma$ value of 2 or larger.

Further, it is desirable that the aforesaid photosensitive material includes a silver salt of an organic acid of an amount of 4 times of the silver halide particles in the aforesaid photosensitive layer in terms of silver quantity. If a silver salt of an organic acid of an amount of 4 times in terms of silver quantity to the silver halide particles in the photosensitive layer is included, the photosensitive material has a high visibility after development, to have the contrast easily made high, but interference fringes can be effectively reduced.

Further, the source of the aforesaid laser beam can be made a laser diode. Besides, with respect to the switching over of the incident angle or making the incident angles different from one another, it is desirable to do it for incident angles against the sub-scanning direction.

DETAILED DESCRIPTION OF THE PREFERRED EMBODIMENT

First, the principle to prevent interference fringes by two (plural) laser beams which are incident at different angles will be explained with reference to FIG. 1 and FIG. 2, citing concrete examples.

(1) The Case of a Single Laser Beam (the Case Where Variation of Light Quantity Occurs Owing to Interference)

Figure 1:
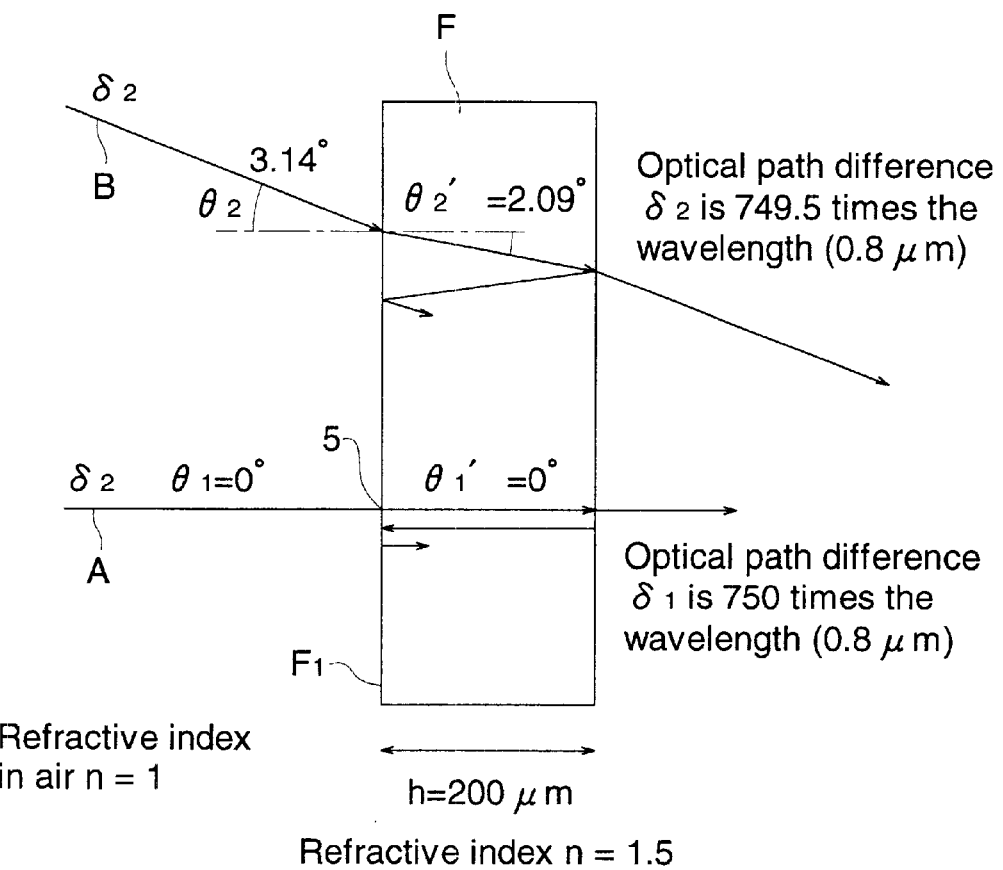
FIG. 1 is a cross-sectional view of a film for explaining the principle of this invention.
Figure 2:
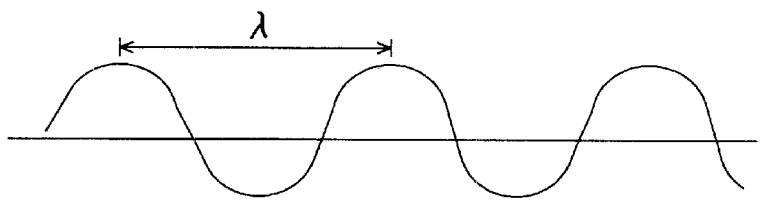
FIG. 2(a) is a drawing showing the wavelength $\lambda$ and the phase of the laser beam at the incident point 5 of the incident beam in FIG. 1.
FIG. 2(b) is a drawing showing the wavelength $\lambda$ and the phase (the same phase as FIG. 2(a)) of the laser beam at the incident point 5 of the reflected beam, and FIG. 2(c) showing the wavelength $\lambda$ and the phase (the reverse phase to FIG. 2(a)) of the laser beam at the incident point 5 of the reflected beam.
Figure 2:
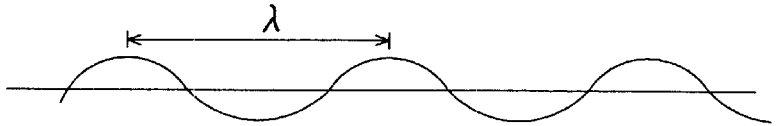
Figure 2:
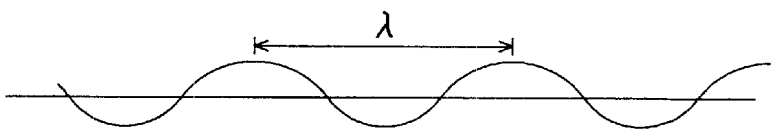

It is considered the case where the laser beam A is incident perpendicularly to the film F, as shown in FIG. 1. Assuming that the thickness h of the film F, which is a thermally developable silver halide photosensitive material, is 200 $\mu$m, its refractive index n is 1.5, and the wavelength of the laser beam is 0.8 $\mu$m, the optical path difference $\delta=2h\times n=2\times 200\times 1.5=600$ $\mu$m becomes an integral multiple of the wavelength as 600/0.8=750. The laser beam in FIG. 1 has such a phase as shown in FIG. 2(a) at the incident point 5 on the obverse surface F1, and a part of the incident beam is reflected by the reverse surface F2 of the film F, and the reflected beam is again reflected at the incident point 5 of the film F, where the beam has such a phase as shown in FIG. 2(b); the light quantity applied to the film F become maximum because the both phases agree with each other. On the other hand, if the thickness of the film F is made 200.13 $\mu$m, the optical path difference $\delta$ becomes 750.5 times the wavelength; hence, the laser beam A, which has been reflected by the reverse surface F2 and further reflected by the obverse surface F1, has such a phase as shown in FIG. 2(c) at the incident point 5 of the reflected beam, the phase being just reverse to the phase shown in FIG. 2(a), assuming that the light quantity of the laser beam incident perpendicularly to the film F is constant, the light quantity applied to the film F becomes minimum. In this way, owing to the variation of the thickness of the film F, the light quantity applied to the film F varies.

(2) The Case Where Two Laser Beams are Incident at Different Angles (Variation of Light Quantity Does Not Occur)

As shown in FIG. 1, the case where two laser beams A and B are incident at different angles to the film F (for convenience, it is assumed that the incident angle of the laser beam A $\theta 1$ is 0°, and the incident angle of the laser beam B $\theta 2$ is 3.14°) will be explained. The optical path difference owing to the internal reflection inside the film F is expressed as $\delta=2nh\cdot\cos\theta'$ (n: the refractive index of the film F, h: the thickness of the film F, $\theta'$: the incident angle inside the film F). Accordingly, the optical path differences $\delta 1$ (laser beam A) and $\delta 2$ (laser beam B) become as follows: $\delta 1$ ($\theta 1'=0°$)= 600 $\mu$m, $\delta 2$ (because $\theta 2=3.14°$ and $\sin\theta 2/\sin\theta 2'=n=11.5$, $\theta 2'=2.09°$)=599.6 $\mu$m. The above-described optical differences $\delta 1$ and $\delta 2$ are 750 times and 749.5 times of the wavelength 0.8 $\mu$m of the laser beams A and B respectively, and the light quantity applied to the film F is medium of the maximum and minimum. Now, in the case where the thickness of the film F is 200.13 $\mu$m, the optical path differences $\delta 1$ and $\delta 2$ for the respective laser beams A and B are as follows: $\delta 1=600.4$ $\mu$m, and $\delta 2=600$ $\mu$m, which are 750.5 times and 750 times the wavelength respectively. Accordingly, the light quantity applied to the film F is medium of the maximum and minimum. As described in the above, even though the thickness of the film F varies, the light quantity applied to the film F does not vary, and it is possible to prevent the generation of interference fringes.

As described in the above, the effect of this invention has been explained under a specified condition, and it is understood that it is possible to prevent the generation of interference fringes and reduce the influence of the interference; further, according to the study of the inventors, in the film of thermally developable silver halide photosensitive material, which has a photosensitive layer including a silver salt of an organic acid and silver halide particles having an average diameter of 0.1 $\mu$m or smaller provided on a supporting member having a thickness of 200 $\mu$m or smaller, has the transmittance for the laser beam which is 20% or larger at the mean wavelength of the laser beam, and has a $\gamma$ value of 2 or larger, it is effective for preventing interference fringes to select the incident angles $\theta 1$ and $\theta 2$ so as to satisfy the expression (3) for any integer N, and it is more effective to select the incident angles $\theta 1$ and $\theta 2$ so as to satisfy the expression (4) for any integer N.

$$(N+0.5-(0.7/\gamma))<(2nh/\lambda)(\cos\theta 1'-\cos\theta 2')<(N+0.5+(0.7/\gamma)) \quad (3),$$

$$(N+0.5-(0.4/\gamma))<(2nh/\lambda)(\cos\theta 1'-\cos\theta 2')<(N+0.5+(0.4/\gamma)) \quad (4),$$

where $\sin\theta/\sin\theta'=n$ ($\theta$: $\theta 1$, $\theta 2$; $\theta'$: $\theta 1'$, $\theta 2'$).

Here, $\gamma$ represents an inclination at the density 1.5 on the characteristic curve of the light sensitive material.

In the following, an embodiment as an example of this invention and examples of practice will be explained. Accordingly, the meaning of the terms in the invention and the invention itself should not be construed with a limitation based on the description of the embodiment of the invention and the examples of practice, and it is a matter of course that they can be suitably changed or improved.

Figure 3:
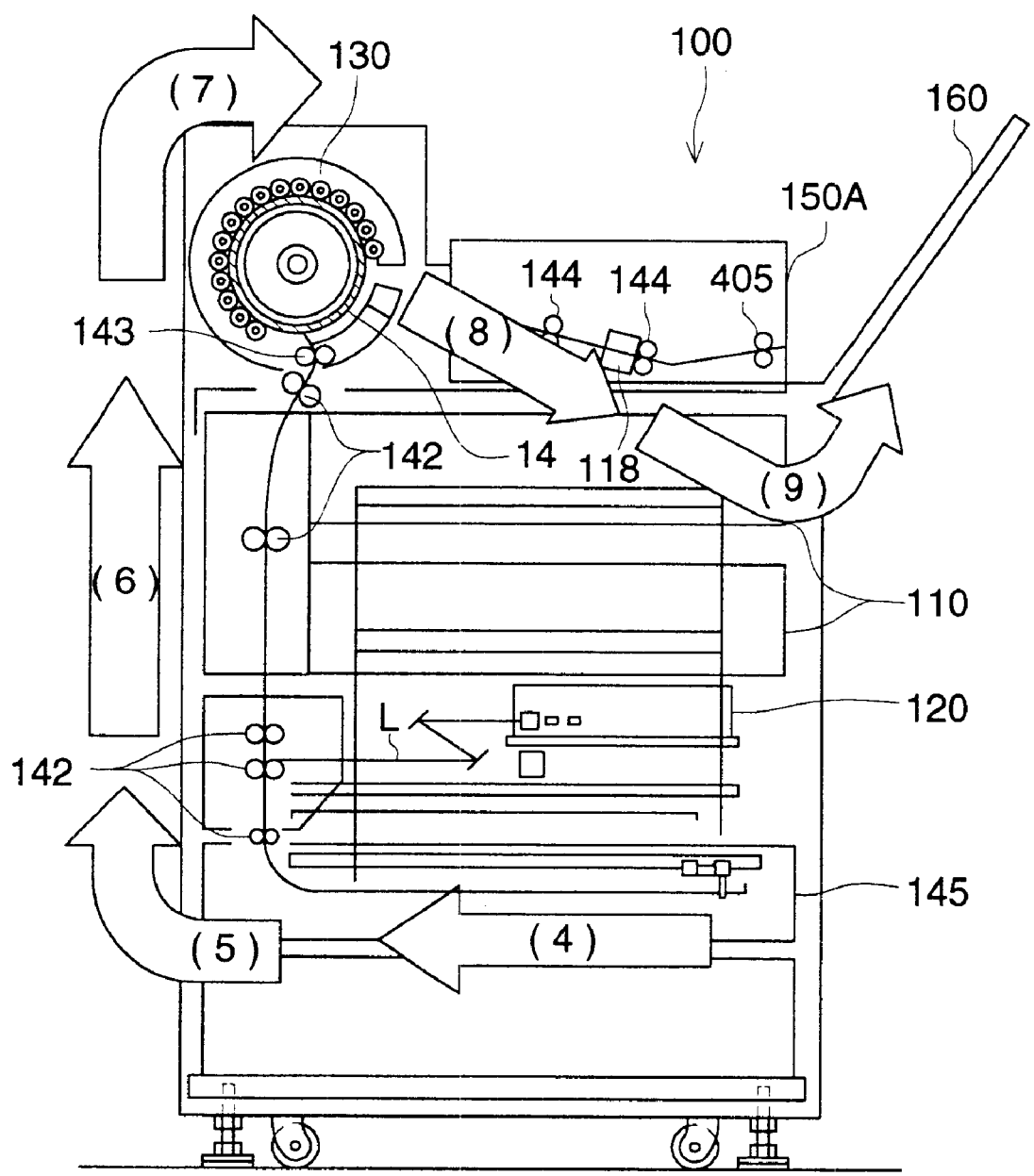
FIG. 3 is the front view of an image recording apparatus of an embodiment of this invention.
Figure 4:
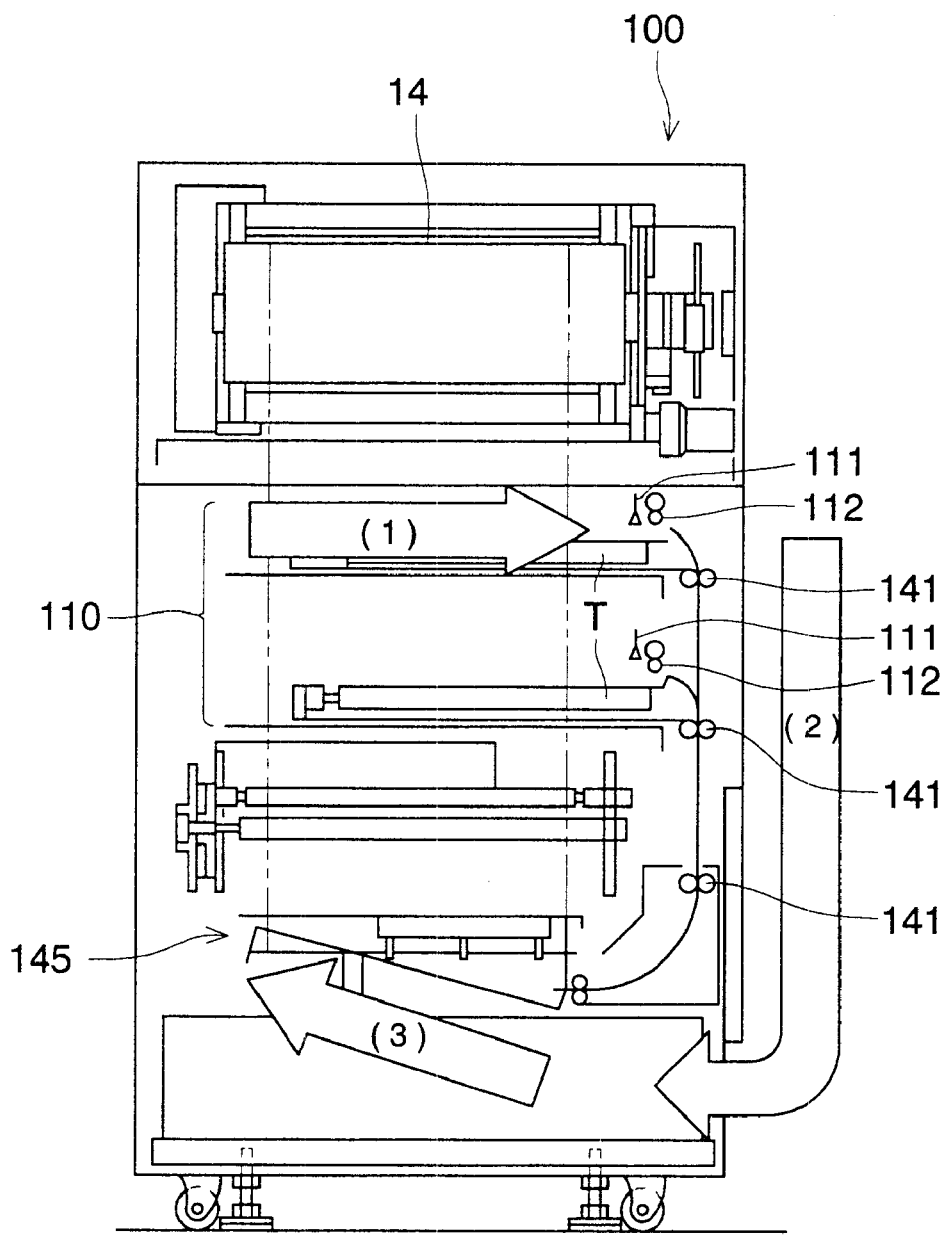
FIG. 4 is the left side view of an image recording apparatus of an embodiment of this invention.

FIG. 3 is the front view of an image recording apparatus of this embodiment, and FIG. 4 is the left side view of this image recording apparatus. The image recording apparatus 100 of this embodiment comprises the feeding section 110 for feeding the films F, which are sheet-shaped thermally developable material, one by one, the exposure section 120 for exposing the fed film F to light, and the thermal development section 130 for developing the exposed film F. The film F is a thermally developable silver halide photosensitive material, which has a photosensitive layer including silver halide particles having an average diameter of 0.1 μm or smaller and a silver salt of an organic acid provided on a supporting member, has the transmittance for the laser beam which is 20% or larger at the mean wavelength of the laser beam, and has a γ value of 2 or larger. In the following, with reference to the drawings, the image recording apparatus of this embodiment will be explained.

In FIG. 3, the feeding section 110 is provided with the trays T for receiving a plurality of stacked films F separately in the upper and lower stage. At the upper portion of the front side portion of each tray T, the attracting unit 111 which moves up and down while attracting the leading edge portion of the film F is provided. Further, in the neighborhood of the attracting unit 111, the feed roller pair 112 for feeding the film F, which has been supplied by the attracting unit 111, to the direction of the arrow mark (1) (horizontal direction) is provided. Further, the attracting unit 111 is capable of moving also back and forth, and conveys the attracted film F to the feed roller pair 112. Further, a plurality of transport roller pairs 141 for transporting the film F, which has been fed by the feed roller pair 112, in the vertical direction are provided. By these transport roller pairs 141, the film F is conveyed in the direction of the arrow mark (2) in FIG. 4 (downward).

In the lower part of the image recording apparatus 100, the transport direction changing portion 145 is provided. As shown in FIG. 3 and FIG. 4, this transport direction changing portion transports the film F, which has been transported by the transport roller pair 141 downward in the vertical direction shown by the arrow mark (2) in FIG. 4, in the horizontal direction as shown by the arrow mark (3), next transports it with the transport direction changed by a right angle from the arrow mark (3) to the arrow mark (4), and next transports the film F, which has been conveyed after its transport direction being changed, upward in the vertical direction shown by the arrow mark (5) in FIG. 5 after changing its transport direction.

Further, as shown in FIG. 3, there are provided a plurality of transport roller pairs 142 for transporting the film F, which has been transported from the transport direction changing portion 145, upward in the vertical direction shown by the arrow mark (6) in FIG. 3, and they transport the film F upward in the vertical direction shown by the arrow mark (6) in FIG. 3 from the left side of the image recording apparatus 100.

On the way of this upward transporting in the vertical direction, the exposure section 120 makes the photosensitive surface of the film F be exposed to the scanning laser beam having a wavelength in the infrared region from 780 nm to 860 nm, to form a latent image corresponding to the exposure image signal.

In the upper part of the image recording apparatus 100, the thermal development section 130 is provided, and in the neighborhood of the drum 14 in the thermal development section 130, there is provided the feed roller pair 143 for feeding the film F, which has been transported by the transport roller pairs 142 upward in the vertical direction shown by the arrow mark (6) in FIG. 3.

The feeding of the film F to the drum 14 is done at a random timing following the process as it proceeds. In addition, it is appropriate to feed the film F at a planned timing instead of random timings.

The drum 14 in the thermal development section 130 thermally develops the film F by heating it, while rotating in the direction shown by the arrow mark (7) in FIG. 3 together with the film F which is in close contact with the outer circumferential surface of the drum 14. That is, the latent image of the film F is made to form a visible image. After that, when the film F comes by rotation to the right side of the drum 14 in FIG. 3, it is detached from the drum 14. At the right side portion of the thermal development section 130, there are provided a plurality of transport roller pairs 144, which make the film F cooled while transporting it to the obliquely right downward direction. Then, while the transport roller pairs 144 are transporting the film F, the densitometer 118 measures the density of the film F. After that, the plural transport roller pairs 114 transport the film F, which has been detached from the drum 14, in the horizontal direction as shown by the arrow mark (9) in FIG. 3, and eject it onto the output tray 160, which is provided at the right upper portion of the image recording apparatus 100, in order that it may be taken out from the upper portion of the image recording apparatus 100.

Figure 5:
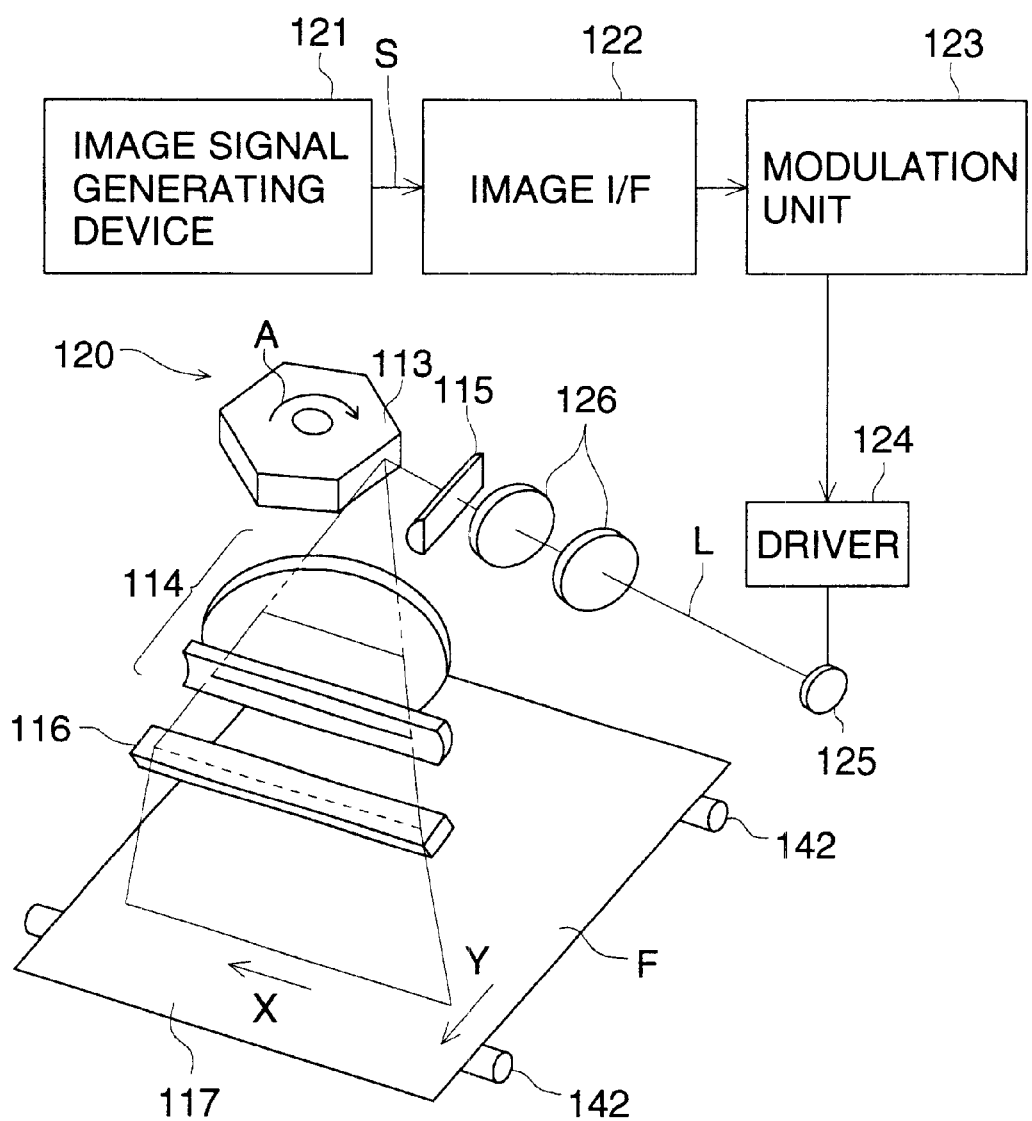
FIG. 5 is a drawing showing the outline of the structure of the exposure section 120 of the image recording apparatus shown in FIG. 3.

FIG. 5 is a conceptional drawing showing the structure of the exposure section 120. The exposure section 120 deflects the laser beam L which has been modulated on the basis of the image signal S by the rotary polygonal mirror 113, to make the main scan on the film F, while it makes the sub-scan by relatively moving the film F in the direction approximately perpendicular to the main scanning direction for the laser beam L, to form a latent image on the film F using the laser beam L.

The image recording apparatus 100 receives the image signal S which is transmitted from the image signal generating device 121 such as a radiation CT apparatus or a scanner through the image I/F 122, to input it in the modulation unit 123. The modulation unit 123 analogue-converts the image signal S and transmits the analogue-converted exposure image signal to the driver 124, which makes a control such that the laser light source unit 125 emits the laser beam in accordance with the exposure image signal transmitted.

The laser light source unit 125 is made up of a laser diode which emits a laser beam having the wavelength λ of, for example, 800 nm, and the laser beam L, which has been emitted from the laser light source unit 125, is made to be a parallel beam and has its diameter regulated by the collimator lenses 126, is converged only in one direction (in this embodiment, in up-and-down direction) by the cylindrical lens 115, and becomes incident on the mirror surface of the rotary polygonal mirror 113 which rotates in the rotating direction shown by the arrow mark A in FIG. 5 as a line image perpendicular to the rotation axis of the rotary polygonal mirror 113. The rotary polygonal mirror 113 reflects and deflects the laser beam L in the main scanning direction, and the deflected laser beam L, after having passed the fθ lens 114, is reflected by the mirror 116, which is provided on the optical path in such a manner as to extend in the main scanning direction, and scans the scan surface of the film F, which is being transported (subjected to the sub-scanning) in the direction of the arrow mark Y by the transport device 142, repeatedly in the main scanning direction. In this way, the laser beam L scans the whole scan surface 117 of the film F.

Figure 6:
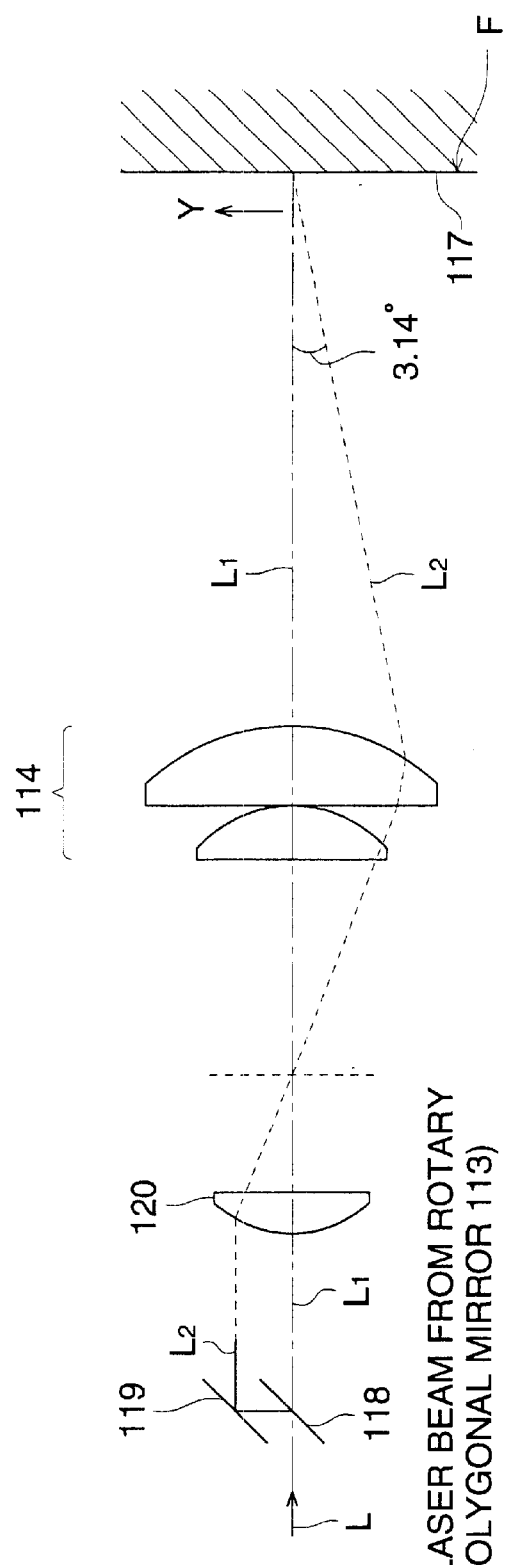
FIG. 6 is a drawing showing the outline of the scanning optical system shown in FIG. 5.

With reference to FIG. 6, it will be explained the structure for obtaining the two laser beams L1 and L2 having different incident angles to the film F from each other from the laser beam L reflected by the rotary polygonal mirror 113 in FIG. 5. The beam splitter 118 such as a semi-transparent mirror is disposed on the optical axis of the laser beam L, and the laser beam L is split by this beam splitter 118 into the laser beams L1 and L2. The laser beam L2 obtained by splitting is reflected by the mirror 119 and enters the film F through the lens 120 and the fθ lens 114, while the laser beam L1 enters the film F along the optical axis. In this case, the laser beam L1 is incident perpendicularly to the sub-scanning direction Y, and the laser beam L2 is incident on the same position as the laser beam L1 with an angle of 3.14° inclined to the laser beam L1 in the sub-scanning direction Y.

As described up to now, a latent image based on the image signal S is formed on the film F; in this case, because the film F is exposed to the laser beams L1 and L2 having different incident angles from each other to the film F (0°, 3.14°), as explained with reference to FIG. 1 and FIG. 2, interference fringes can be effectively reduced even though there is a variation in the thickness of the film F, which makes it possible to reduce the unevenness of density in the film F after thermal development, to improve the image quality.

Besides, in the above-described case, the optical system shown in FIG. 5 and FIG. 6 has a structure such that the laser beams L1 and L2 having incident angles to the film F (0°, 3.14°) which are different from each other toward the sub-scanning direction Y becomes incident onto the same pixel; however, similar effect can be obtained also by making the optical system have a structure such that the laser beams L1 and L2 becomes incident onto different pixels respectively. In this case, it may be preferable that the pixels onto which the laser beams L1 and L2 become incident respectively are neighboring pixels. Further, it is not necessary that the incident angle of the laser beam L1 is 0°, that is, the laser beam is incident perpendicularly to the sub-scanning direction Y of the film F, it may be oblique to it.

Figure 16:
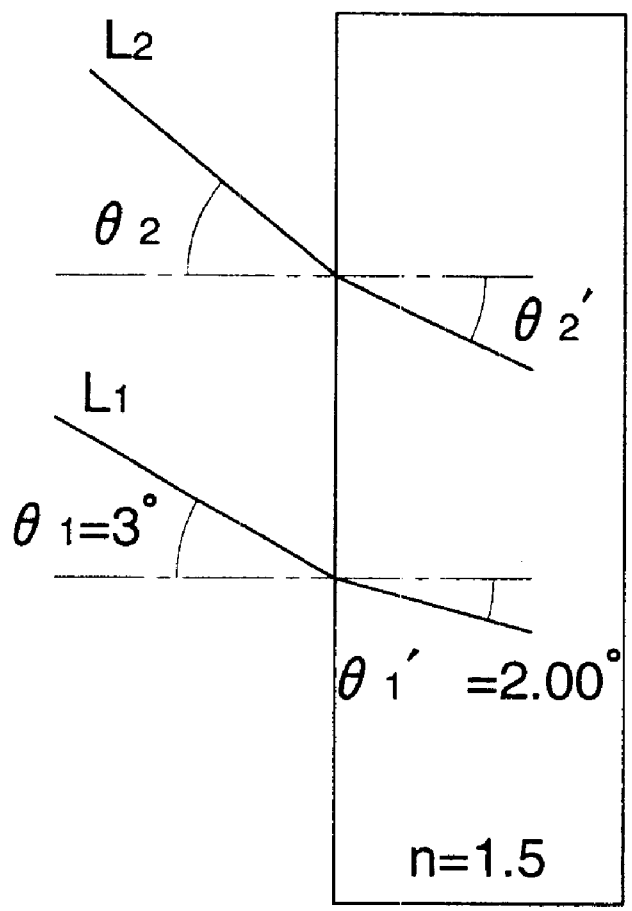
FIG. 16 is a cross-sectional view of a film for explaining the operation in this embodiment.

In the following, it will be explained the operation in the case where the incident angle of the laser beam L1 is made oblique. As shown in FIG. 16, in the case where the incident angle of the L1 (=θ1) is 3.00°, the condition for the incident angle of the L2 (=θ2) in which interference fringes can be most effectively reduced is to be obtained. In this case, θ1' becomes approximately equal to 2.00°. Because the reduction effect becomes maximum if θ2' satisfies the condition (2nh/λ)(cos θ1'−cos θ2')=0.5, by solving the above equation for θ2' by substituting 2.00°, 1.5, 200 μm, and 0.8 μm for θ1', n, h, and λ respectively, θ2'=2.89° is obtained. Therefore, for the incident angle of the L2, 4.34° can be obtained. In comparison with the case where the L1 is made incident perpendicularly (θ2−θ1=3.14°), a smaller difference of angles between the L1 and the L2 (θ2−θ1=1.34°) is used, which gives the advantage that the optical system is easily made up and is easily made small-sized. This advantage becomes remarkable in the case where the incident angles of the two laser beams toward the sub-scanning direction Y are both 2° or larger (especially 3° or larger).

Figure 7:
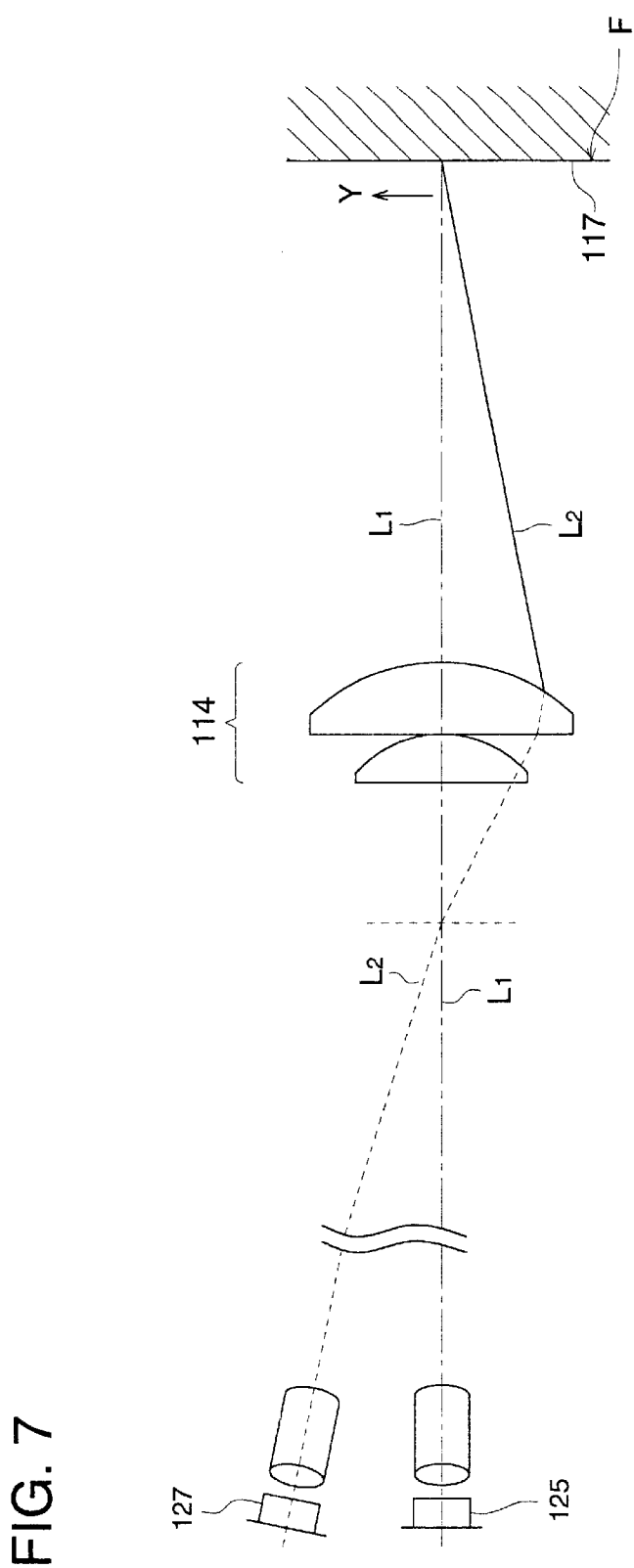
FIG. 7 is a drawing showing the outline of a modified example of the scanning optical system shown in FIG. 6.

In the following, with reference to FIG. 7, a modified example of the exposure section 120 will be explained. This modified example has a structure such that the laser light source unit 127 is provided in addition to the laser light source unit 125, and two laser beams are emitted and have their incident angles made different from each other. The laser beam L1 from the laser light source unit 125 is incident onto the film F perpendicularly to the sub-scanning direction Y as in FIG. 6. On the other hand, the optical system shown in FIG. 5 and FIG. 6 has a structure such that the laser beam L2 from the laser light source unit 127 is incident onto the same position as the laser beam L1 making an angle of 3.14° with the optical axis toward the sub-scanning direction Y.

As described in the above, because the film F is exposed to the laser beams L1 and L2 having incident angles to the film F (0°, 3.14°) which are different from each other toward the sub-scanning direction Y in this example too, interference fringes can be effectively reduced even though there is a variation in the thickness of the film F, which makes it possible to reduce the unevenness of density in the film F after thermal development, to improve the image quality. Besides, in the above-described case, the optical system has a structure such that the laser beams L1 and L2 are incident on the same pixel of the film F; however, similar effect can be obtained, by making the system have a structure such that the laser beams L1 and L2 are incident onto neighboring pixels respectively.

Figure 8:
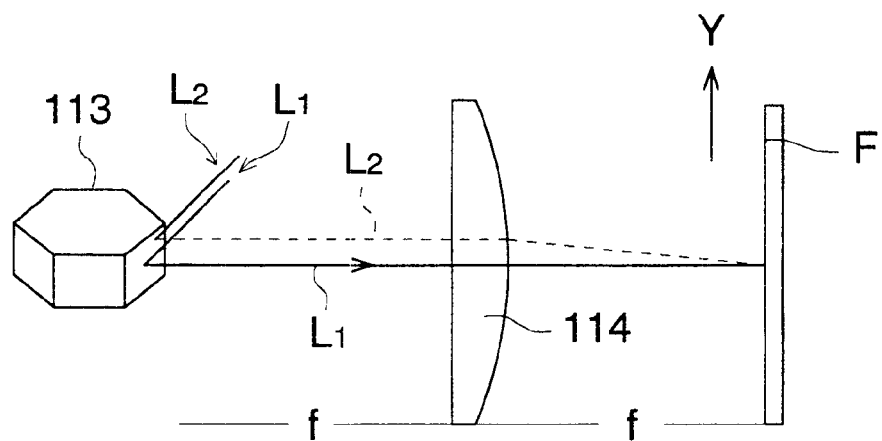
FIG. 8 is a drawing showing the outline of another example of the scanning optical system shown in FIG. 6.

In the following, with reference to FIG. 8 and FIG. 9, two another modified examples will be explained. In FIG. 8, the optical system has a structure such that the two laser beams L1 and L2 parallel to each other are emitted from the laser light source unit, are reflected and deflected by the polygonal mirror 113, the laser beam L1 becomes incident onto the film F perpendicularly to the sub-scanning direction through the fθ lens 114a, and the laser beam L2 becomes incident with an incident angle of 3.14°. In this case, the two laser beams L1 and L2 may be obtained from two laser light source units, or may be obtained by splitting a laser beam from a single laser light source unit as explained in FIG. 6 or in FIG. 10 to be described later. Further, by adjusting the parallel spacing between the laser beams L1 and L2 which are incident on the rotary polygonal mirror 113, the incident angle of the laser beams can be adjusted.

Figure 9:
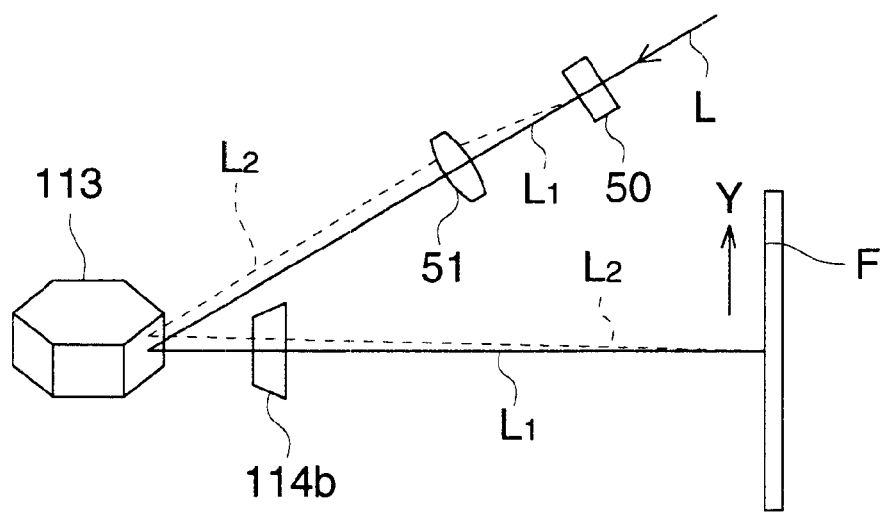
FIG. 9 is a drawing showing the outline of a further another example of the scanning optical system shown in FIG. 6.

In FIG. 9, the optical system has a structure such that by making the laser beam L from the laser light source unit enter the light modulator device 50 such as an ultrasonic optical deflector, to split it into the laser beams L1 and L2, the laser beams L1 and L2 which have been made parallel through the lens 51 are reflected and deflected by the rotary polygonal mirror 113, and the laser beam L1 becomes incident onto the film F perpendicularly to the sub-scanning direction Y through the fθ lens 114b, while the laser beam L2 becomes incident at an incident angle of 3.14°.

Figure 10:
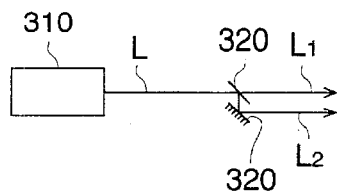
FIGS. 10(a) to 10(g) are drawings showing the outlines of various kinds of optical systems for obtaining a plurality of laser beams in the exposure section shown in FIG. 5.
Figure 10:
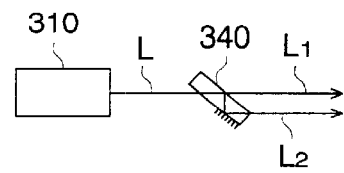
Figure 10:
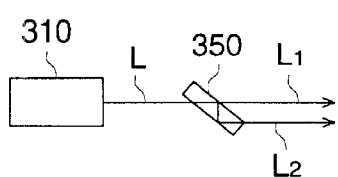
Figure 10:
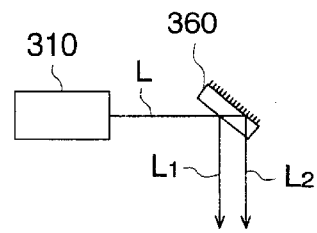
Figure 10:
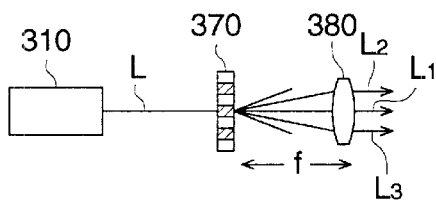
Figure 10:
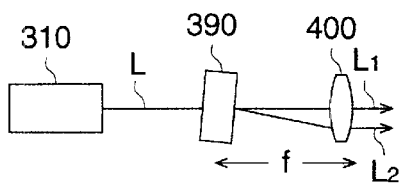
Figure 10:
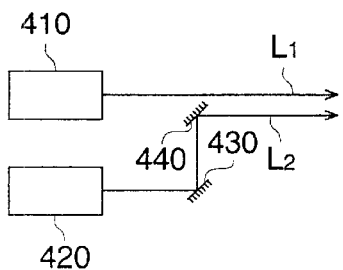

Further, with reference to FIG. 10, the structure for obtaining a plurality of parallel laser beams will be explained. In FIG. 10(a), a part of the laser beam L from the single laser light source unit 310 is reflected by the semi-transparent mirror 320 to make the laser beam L2, and the laser beam L2 reflected by the mirror 330 progresses parallel to the laser beam L1 which has passed the semitransparent mirror 320. In FIG. 10(b), it is used the compound semi-transparent mirror 340 having a structure such that the upper half of one surface of the planer substrate having parallel surfaces is made to be a semitransparent mirror, its lower half is a light transmitting member, and the lower half of the other surface of the substrate is an internal reflection mirror and its upper half is a light transmitting member. In FIG. 10(c), it is used the planer substrate having parallel surfaces 350 of which both surfaces are a semitransparent mirror. In FIG. 10(d), it is used the substrate 360 of which the surface of incidence is made a semitransparent mirror, and its reverse surface is made a total reflection mirror. In FIG. 10(e), the laser beam is made to enter the diffraction grating 370 to be split, and the 0th order beam and the ±1st order beams are made to pass the lens 380, to obtain the parallel beams L1, L2, and L3, one of which may be cut if necessary. In FIG. 10(f), the laser beam L is made to enter the acousto-optic modulator (AOM) 390, and the 0th order beam and the first order beam are made to pass a lens, to obtain the parallel beams L1 and L2. In FIG. 10(g), the laser beams L1 and L2 are obtained from the two laser light source units 410 and 420, and the parallel spacing is made adjustable by the mirrors 430 and 440.

Figure 11:
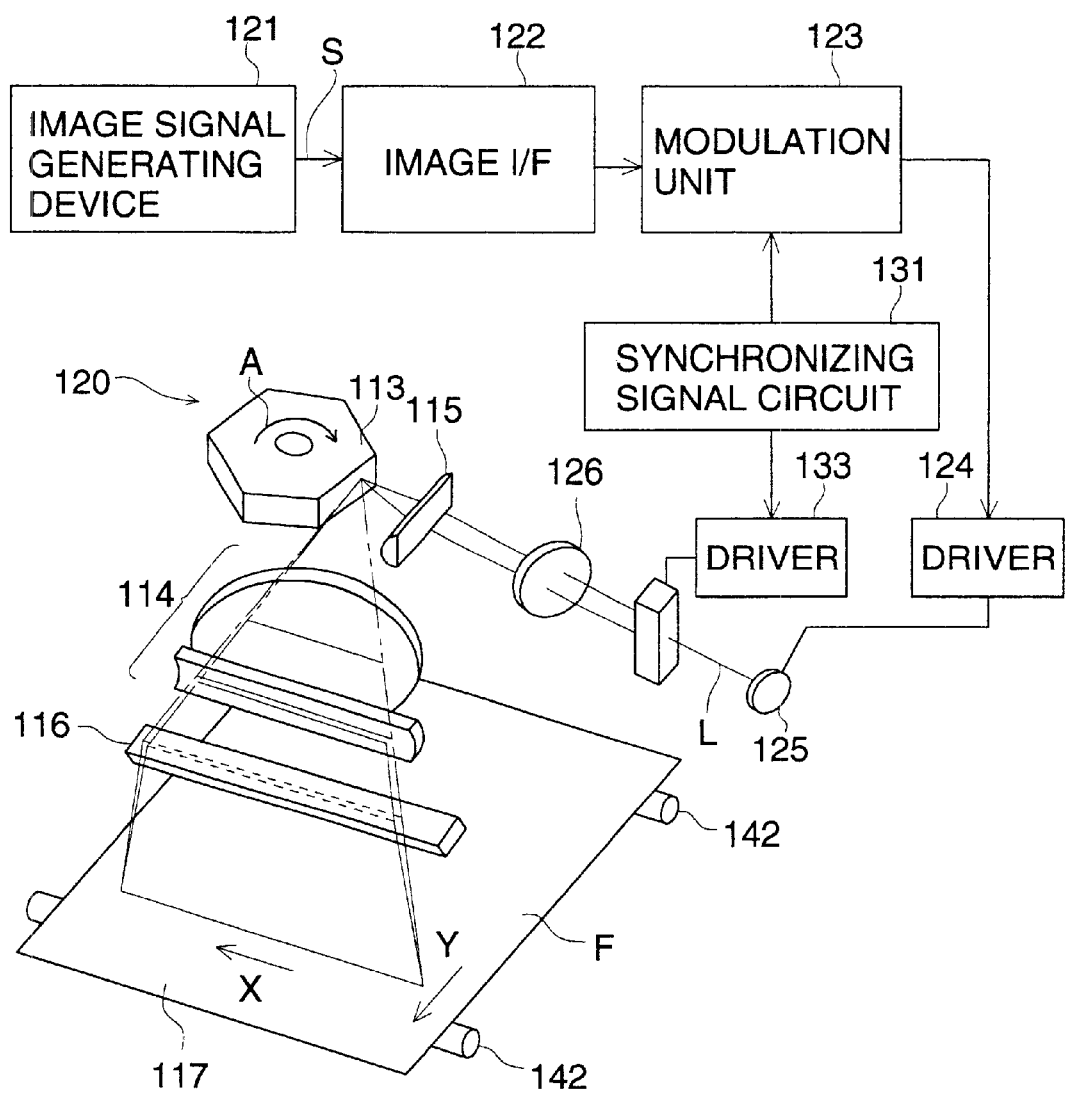
FIG. 11 is a drawing showing a modified example of the exposure section shown in FIG. 5.
Figure 12:
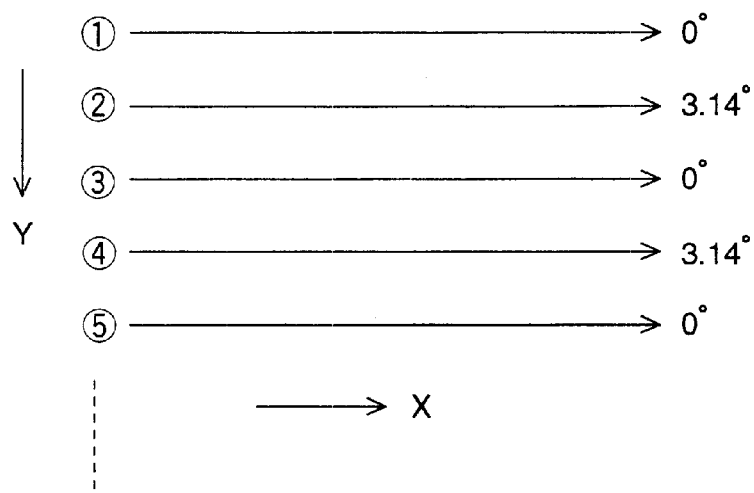
FIG. 12 is a drawing for explaining the operation of the exposure section shown in FIG. 11.

In the following, with reference to FIG. 11 and FIG. 12, an other modified example will be explained. This modified example has a structure such that the incident angle of the laser beam from a single laser light source unit is made to be variable for each scan line toward the sub-scanning direction Y in the film F. As shown in FIG. 11, the acousto-optic modulator 129 is disposed between the laser light source unit 125 made up of a laser diode and the collimator lens 126, this acousto-optic modulator 129 operates in synchronism with the synchronizing signal from the synchronizing signal circuit 131 through the driver 133, and the timing can be determined so as to switch over the incident angle of the laser beam which is incident on the film F toward the sub-scanning direction Y between 0° and 3.14°. Further, at the timing of this synchronizing signal, the laser light source unit 125 is driven through the driver 124. It is possible to make up the incident angle changing means for switching over the incident angle of a laser beam to the film F of the acousto-optic modulator 129 and the synchronizing signal circuit 131.

It may also be possible to arrange such that on the scanning line which is at the order where the remainder of "3" becomes "1" (for example, the first scanning line), the acousto-optic modulator 129 conducts modulation on the basis of image signals S when an incident angle is 0°, and on the scanning line which is at the order where the remainder of "3" becomes "2" or "0" (for example, the second scanning line or the third scanning line), the acousto-optic modulator 129 conducts modulation on the basis of the half value of image signals S when an incident angle is 3.14°.

The laser beam L which has been modulated in accordance with the image signal S is emitted from the laser light source unit 125, and its incident angle to the film F toward the sub-scanning direction Y is switched over for each scan line between 0° and 3.14° by the synchronizing signal from the synchronizing signal circuit 131. As shown in FIG. 12, the incident angle is switched over alternately for a plurality of scan lines in a manner such that the incident angle for the first scan line in the scanning direction X is 0°, the incident angle for the second scan line is 3.14°, the incident angle for the third scan line is 0°, the incident angle for the fourth scan line is 3.14°, and so forth. By doing this, interference fringes can be effectively reduced even though there is a variation in the thickness of the film F, which makes it possible to reduce the unevenness of density in the film F after thermal development, to improve the image quality.

Figure 13:
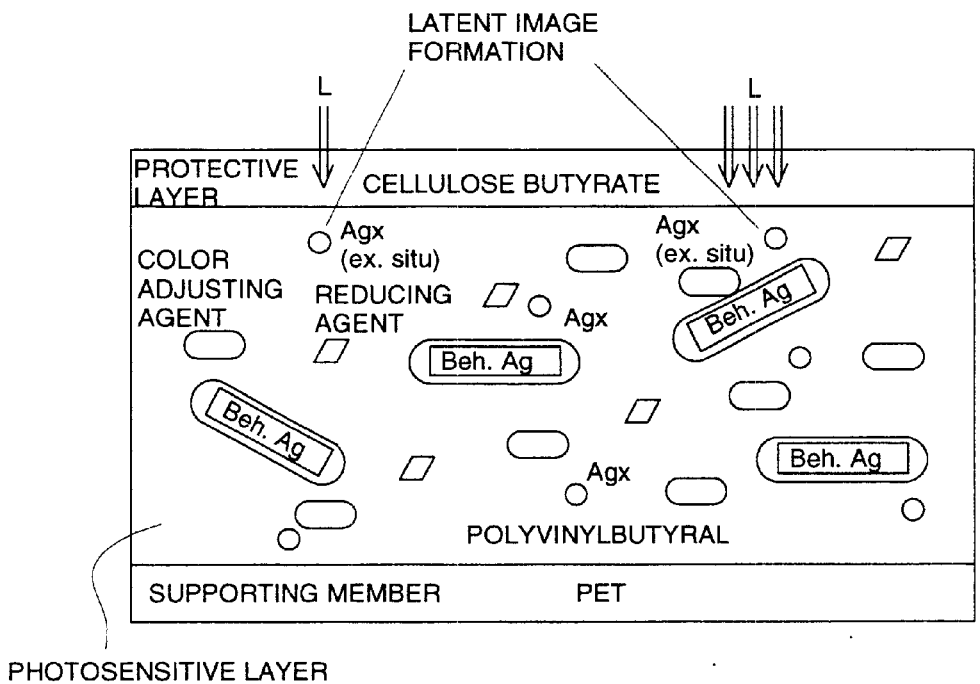
FIG. 13 is a cross-sectional view of the film F in this embodiment, and is a drawing showing schematically the chemical reaction in the film F at the time of exposure.
Figure 14:
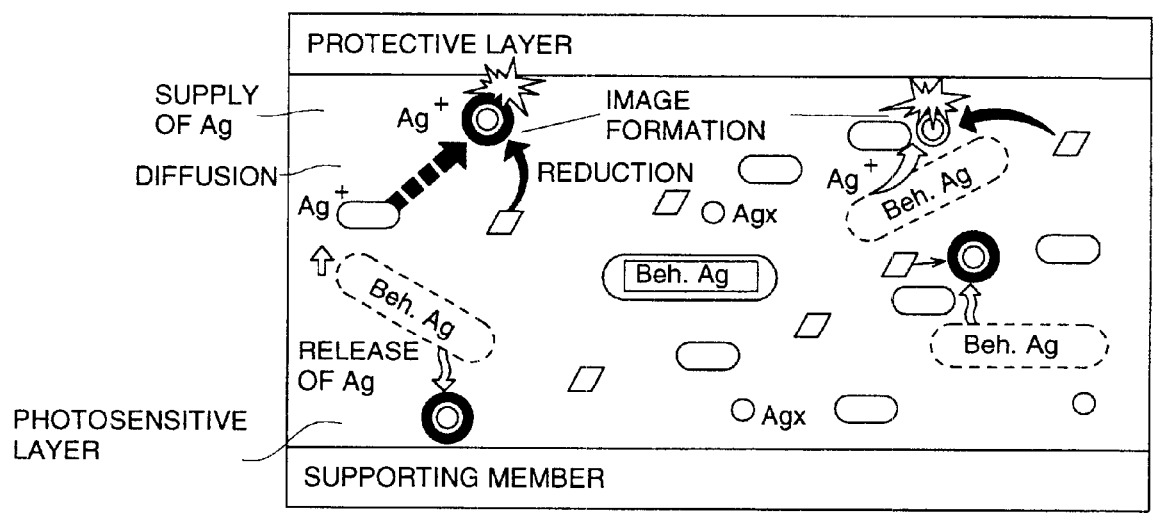
FIG. 14 is a cross-sectional view as FIG. 13 showing schematically the chemical reaction in the film F at the time of heating.
Figure 15:
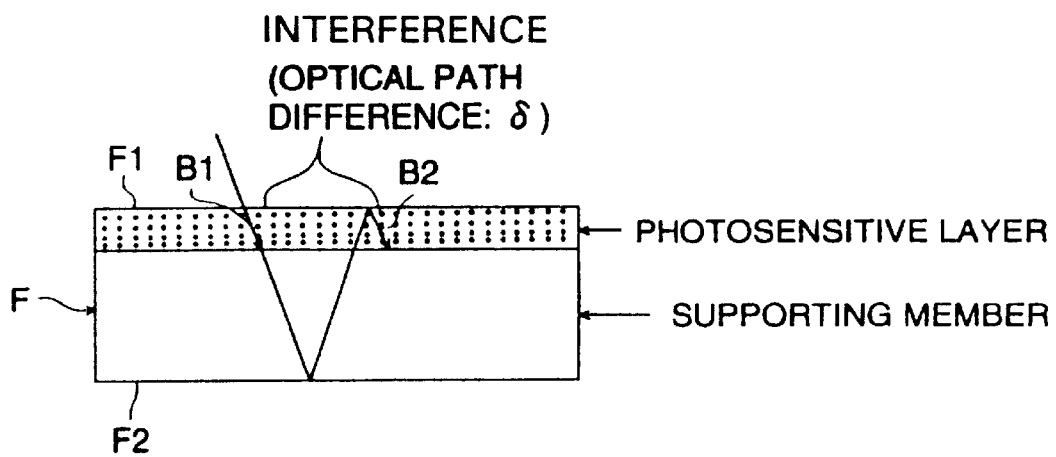
FIGS. 15(a) and 15(b) are cross-sectional views of a film (a) and (b) for explaining the problems in conventional technology.
Figure 15:
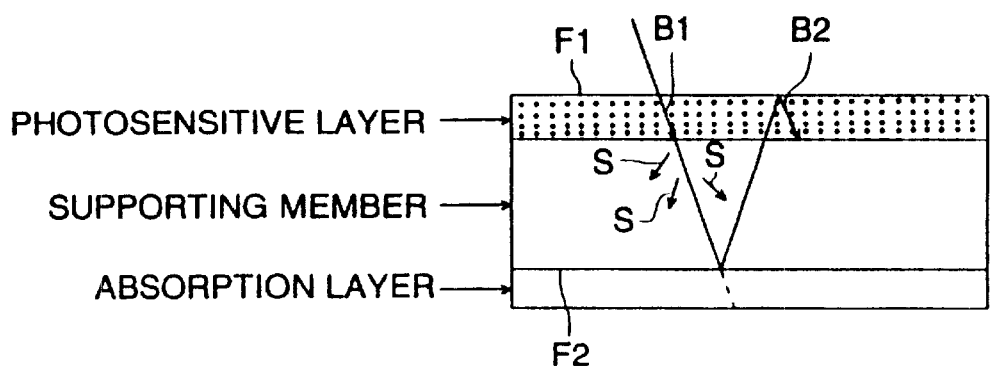

Next, film F mentioned above will be explained. FIG. 13 is a cross-sectional view of the film F shown in the example of practice, and is a drawing showing schematically the chemical reaction in the film F at the time of exposure. FIG. 14 is a cross-sectional view similar to FIG. 13 showing schematically the chemical reaction in the film F at the time of heating. The film F has a photosensitive layer mainly composed of a polyvinylbutyral formed on a supporting member (base layer) composed of a PET, and further a protective layer composed of a cellulose butyrate formed on them. In the photosensitive layer, there are mixed silver behenate (Beh. Ag), a reducing agent, and a color adjusting agent.

At the time of exposure, when the laser beam L irradiates the film F from the exposure section 120, as shown in FIG. 13, the silver halide particles receive the light to form a latent image in the region irradiated by the laser beam L.

Further, when the film F is heated, as shown in FIG. 11, silver ions ($Ag^+$) are released from silver behenate particles, and the silver behenate particles which have released silver ions form a complex compound with the color adjusting agent. It seems that the silver ions diffuse after that, and a latent image is formed by a chemical reaction through the action of the reducing agent with the silver halide particles which have sensed the light made as nuclei. As described in the above, the film F has a structure such that it includes photosensitive silver halide particles, organic silver salt particles, and a silver ion reducing agent, and is not thermally developed substantially at a temperature equal to or lower than 40° C., and is thermally developed at a temperature equal to or higher than the lowest thermal development temperature, namely, 80° C.

The ratio of photosensitive silver halides employed in a thermally developable material to organic silver salts may typically be in the range of 0.75 to 25 mole percent, and is preferably in the range of 2 to 20 mole percent. Further, it may be preferable that the film F contains the organic silver salts four times greater in terms of an amount of silver than silver halide particles in the light sensitive layer. Still further, an average particle diameter of the silver halide particles is not larger than 0.1 µm.

Such silver halides include all types of photosensitive silver halides such as silver bromide, silver iodide, silver bromoiodide, silver chlorobromide, silver chlorobromide, and the like, and said silver halides are not limited to these. Further, said silver halides may posses any of several forms such as a cubic form, an orthorhombic form, a planar from, a tetrahedron, and the like, as long as they are photosensitive.

Organic silver salts include all organic materials which comprise silver ion reducing sources. Silver salts of organic acids, especially long chain fatty acids (having from 10 to 30 carbon atoms and preferably from 15 to 28 carbon atoms) are preferred. Organic or inorganic silver complexes are preferred which are definitely stable with between 4.0 and 10.0 of total ligands, and the weight ratio of said complexes is preferably between about 5 and about 30 percent of the image forming layer.

Such organic silver salts, which may be employed in the present thermally developable material, are relatively stable against light, and form silver images when heated to 80° C. and higher in the presence of an exposed light catalyst (for instance, photographic silver halides and the like) as well as reducing agents.

Preferred organic silver salts include silver salts of organic compounds having a carboxyl group(s). Preferred examples of silver salts of aliphatic carboxylic acids include silver behenate, silver stearate, and the like. Silver salts bonding to a halogen atom or a hydroxyl group in aliphatic carboxylic acids may effectively be employed. Silver salts of compounds having a mercapto or thione group and derivatives thereof may also be employed. Further, silver salts with imino group containing compounds may further be employed.

Employed as reducing agents for organic silver salts may be any compounds which can reduce silver ions to silver, and organic materials are preferred. Conventional photographic developing agents such as phenidone, hydroquinone, and catechol are useful. Of these, phenol reducing agents are preferred. The reducing agents should be present in an amount of 1 to 10 weight percent of the image forming layer. In a multilayer configuration, when the reducing agents are incorporated into layers other than the emulsion layer, the content ratio is preferably between about 2 and about 15 weight percent, which is slightly greater than the former.

Embodiment

In the case that the film F mentioned below is exposed and thermally developed by an apparatus of the abovementioned present example or a modified example, no density irregularity caused by the occurrence of interference fringes was observed. At this time, an average wavelength of the laser beam was 600 nm and the light transmissive ratio of the light sensitive material at the average wavelength was 60%. Hereinafter, the production of the film F will be explained.

A silver halide-silver behenate dry soap was prepared employing the method described in U.S. Pat. No. 3,839,049. The content ratio of said silver halide was 9 mole percent of the total silver, while that of silver behenate was 91 mole percent of the total silver. Said silver halide was a 0.055 μm-average diameter silver bromoiodide emulsion comprising 2 percent iodide.

A thermally developable emulsion was uniformly mixed with 455 g of the aforementioned silver halide-silver behenate dry soap, 27 g of toluene, 1918 g of 2-butanone, and poly(vinyl butyral) (B-79, manufactured by Monsanto). The aforementioned uniformly mixed thermally developable emulsion (698 g) and 60 g of 2-butanone were cooled to 12.8° C. while being stirred. Pyridinium hydrobromide perbromide (0.92 g) was then added and the resulting mixture was then stirred for additional 2 hours.

Added to the resulting mixture were 3.25 milliliters of a calcium bromide solution (consisting of $CaBr_2$ (1 g) and 10 milliliters of methanol), and subsequently stirred for 30 minutes. Further, poly(vinyl butyral) (158 g of B-79, manufactured by Monsanto) was added and stirred for 20 minutes. Then, after heating the resulting mixture to 21.1° C., the components described below were added while string over 15 minutes.

| | |
|---|---|
| 2-(Tribromomethylsulfone)quinoline | 3.42 g |
| 1.1-Bis(2-hydroxy-3,5-dimethylphenyl)-3,5,5-trimethylhexane | 28.1 g |
| Solution comprising 0.545 g of 5-methylmercaptobenzimidazole | 41.1 g |
| 2-(4-Chlorobenzoyl)benzoic acid | 6.12 g |
| S-1 (sensitizing dye) | 0.104 g |
| Methanol | 34.3 g |
| Isocyanate (Desumoda N3300, manufactured by Mobay) | 2.14 g |
| Tetrachlorophthalic anhydride | 0.97 g |
| Phthalazine | 2.88 g |

Further, Dye S-1 has the following structure.

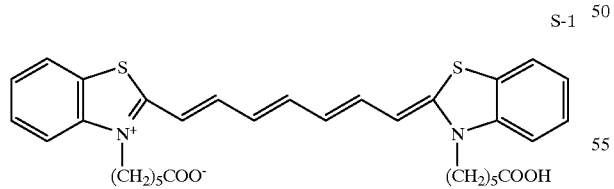

S-1

An active top coat solution was prepared using the following components:

| | |
|---|---|
| 2-Butanone | 80.0 g |
| Methanol | 10.7 g |
| Cellulose acetate butyrate (CAB-171-155, manufactured by Eastman Chemicals) | 8.0 g |

-continued

| | |
|---|---|
| 4-Methylphthalic acid | 0.52 g |
| MRA-1, motoru reducing agent, tertiary polymer of N-ethylperfluoroctanesulfonylamidoethyl methacrylate/hydroxyethyl methacrylate/acrylic acid having a weight ratio of 70:20:10 | 0.80 g |

The resulting thermally developable emulsion and top coat were simultaneously applied to a 0.18 mm blue-tinted polyester film base. A knife coater was arranged in such a manner that two bars and knives for simultaneous coating were installed to be at a distance of 15.2 cm between them. A multilayer coating was carried out in such a manner that for the silver trip layer as well as the top coat, the silver emulsion was poured onto the film prior to the rear knife, and the top coat was poured onto the film prior to the front bar.

The resulting film was then transported forward so that both layers were simultaneously coated. The coating was obtained by carrying out employing one multilayer coating method. The coated polyester base was dried at 70.4° C. for 4 minutes. Said knives were adjusted so as to obtain a dried coated layer weight of 23 g/m² for the silver layer and the same of 2.4 g/m² for the top coat. Besides, the optical path difference determined by the thickness between the obverse surface F1 and the reverse surface F2 and the refractive index of this photosensitive material was 600 μm. The thickness of the support was 180 μm and the γ value of the light sensitive material was 3.0.

According to the image recording method and the image recording apparatus of this invention, interference fringes at the time of exposure of the photosensitive material can be reduced, and the quality of the image formed on the photosensitive material can be improved.

What is claimed is:

1. An image recording apparatus, comprising:

a laser beam source to emit a laser beam, and incident angle changing means for changing an incident angle, in a sub scanning direction, of the laser beam emitted from the laser beam source onto a light sensitive material, wherein the incident angle changing means changes the incident angle of the laser beam emitted from the laser beam source on the light sensitive material from θ1 to θ2, and wherein the incident angle θ1, an incident angle θ1' at which the laser beam incident at the incident angle θ1 on the light sensitive material is incident in the light sensitive material, the incident angle θ2, an incident angle θ2' at which the laser beam incident at the incident angle θ2 on the light sensitive material is incident in the light sensitive material, and one of integers N satisfies the following formula:

$(N+0.5-(0.7/\gamma))<(2nh/\lambda)(\cos\theta1'-\cos\theta2')<(N+0.5+(0.7/\gamma))$ where n denotes a refractive index of the light sensitive material, h denotes a thickness of the light sensitive material, λ denotes a wavelength of the laser beam and γ is a gamma value of the light sensitive material.

2. The image recording apparatus of claim 1, further comprising:

an optical scanning device which scans the light sensitive material with the laser beam in a main scanning direction, wherein the sub scanning direction is substantially perpendicular to the main scanning direction.

3. The image recording apparatus of claim 1, further comprising:
scanning means for scanning the light sensitive material with the laser beam in a main scanning direction along a scanning line; and
shifting means for shifting at least one of the laser beam and the light sensitive material in a sub-scanning direction substantially perpendicular to the main scanning direction so that the scanning means scans the light sensitive material with the laser beam in the main scanning direction along another scanning line;
wherein the incident angle changing means changes the incident angle of the laser beam on the light sensitive material from θ1 to θ2 for every N-th scanning line, where N is a predetermined integer.

4. The image recording apparatus of claim 1, wherein the incident angle changing means comprises an optical modulating element to change an outgoing angle of the laser beam.

5. The image recording apparatus of claim 1, wherein the gamma value γ of the photosensitive material is not smaller than 2.

6. The image recording apparatus of claim 5, wherein the light sensitive material comprises a support having a thickness of 200 μm or less and a light sensitive layer provided on the support and containing an organic acid silver salt and silver halide particles having an average particle size of 0.1 μm or less and wherein the light sensitive material has a light transmission ratio of 20% or more for a laser beam having an average wavelength.

7. The image recording apparatus of claim 6, wherein the light sensitive material contains the organic acid silver salt four times greater in terms of an amount of silver than the silver halide particles in the light sensitive layer.

8. The image recording apparatus of claim 1, wherein the laser beam source is a laser diode.

9. An image recording apparatus, comprising:
a laser beam source to emit plural laser beams, and
an optical system for changing an incident angle, in a sub scanning direction, of at least one of the plural laser beams emitted from the laser beam source onto a light sensitive material,
wherein the optical system changes the incident angle of the at least one of the plural laser beams emitted from the laser beam source on the light sensitive material from θ1 to θ2, and
wherein the incident angle θ1, an incident angle θ1' at which the laser beam incident at the incident angle θ1 on the light sensitive material is incident in the light sensitive material, the incident angle θ2, an incident angle θ2' at which the laser beam incident at the incident angle θ2 on the light sensitive material is incident in the light sensitive material, and one of integers N satisfies the following formula:

$$(N+0.5-(0.7/\gamma)) < (2nh/\lambda)(\cos\theta1' - \cos\theta2') < (N+0.5+(0.7/\gamma))$$

where n denotes a refractive index of the light sensitive material, h denotes a thickness of the light sensitive material, λ denotes a wavelength of the at least one of the plural laser beams, and γ is a gamma value of the light sensitive material.

10. The image recording apparatus of claim 9, further comprising:
an optical scanning device which scans the light sensitive material with the plural laser beams in a main scanning direction, wherein the sub scanning direction is substantially perpendicular to the main scanning direction.

11. The image recording apparatus of claim 9, wherein the laser beam source comprises an optical splitter to split a single laser beam generated by a laser generator into the plural laser beams and the optical system changes an incident angle of at least one of the plural laser beams split by the optical splitter onto the light sensitive material.

12. The image recording apparatus of claim 11, further comprising:
scanning means for scanning the light sensitive material with the plural laser beams in a main scanning direction along a scanning line; and
shifting means for shifting at least one of the plural laser beams and the light sensitive material in a sub-scanning direction substantially perpendicular to the main scanning direction so that the scanning means scans the light sensitive material with said one of the plural laser beams in the main scanning direction along another scanning line;
wherein the at least two laser beams of the plural laser beams split by the optical splitter are scanned along substantially the same scanning line.

13. The image recording apparatus of claim 9, wherein the laser beam source comprises plural laser beam generators and the optical system changes an incident angle of at least one of the plural laser beams generated by the plural laser beam generators onto the light sensitive material.

14. The image recording apparatus of claim 9, further comprising:
scanning means for scanning the light sensitive material with the plural laser beams in a main scanning direction along a scanning line; and
shifting means for shifting at least one of the plural laser beams and the light sensitive material in a sub-scanning direction substantially perpendicular to the main scanning direction so that the scanning means scans the light sensitive material with said plural laser beams in the main scanning direction along another scanning line;
wherein the laser beam source comprises plural laser beam generators and the scanning means scans the plural laser beams generated by the plural laser beam generators along plural substantially different scanning lines and the optical system changes an incident angle of each of at least two laser beams of the plural laser beams onto the light sensitive material.

15. The image recording apparatus of claim 9, wherein the gamma value γ of the light sensitive material is not smaller than 2.

16. The image recording apparatus of claim 15, wherein the light sensitive material comprises a support having a thickness of 200 μm or less and a light sensitive layer provided on the support and containing an organic acid silver salt and silver halide particles having an average particle size of 0.1 μm or less and wherein the light sensitive material has a light transmission ratio of 20% or more for a laser beam having an average wavelength.

17. The image recording apparatus of claim 16, wherein the light sensitive material contains the organic acid silver salt four times greater in terms of an amount of silver than the silver halide particles in the light sensitive layer.

18. The image recording apparatus of claim 9, wherein the laser beam source is a laser diode.

19. An image recording method, comprising the steps of:
scanning a light sensitive material along a scanning line in a main scanning direction with a laser beam incident at an incident angle θ1 onto the light sensitive material; and changing the incident angle of the laser beam $\theta1$ to $\theta2$ different from $\theta1$ for every N-th scanning line, where N is a predetermined integer;

wherein the incident angle $\theta1$, and incident angle $\theta1'$ at which the laser beam incident at the incident angle $\theta1$ on the light sensitive material is incident in the light sensitive material, the incident angle $\theta2$, an incident angle $\theta2'$ at which the laser beam incident at the incident angle $\theta2$ on the light sensitive material is incident in the light sensitive material, and one of integers N satisfies the following formula:

$$(N+0.5-(0.7/\gamma))<(2nh/\lambda)(\cos\theta1'-\cos\theta2')<(N+0.5+(0.7/\gamma))$$

where, n denotes a refractive index of the light sensitive material, h denotes a thickness of the light sensitive material, $\lambda$ denotes a wavelength of the laser beam and $\gamma$ is a gamma value of the light sensitive material.

20. The image recording method of claim 19, wherein the light sensitive material comprises a support having a thickness of 200 $\mu$m or less and a light sensitive layer provided on the support and containing an organic acid silver salt and silver halide particles having an average particle size of 0.1 $\mu$m or less and wherein the light sensitive material has the gamma value $\gamma$ or 2 or more and a light transmission ratio of 20% or more for a laser beam having an average wavelength.

21. An image recording method, comprising the steps of:
emitting a laser beam to be incident at an incident angle $\theta1$ onto a light sensitive material so as to form a first pixel, and emitting a laser beam to be incident at an incident angle $\theta2$ onto a light sensitive material so as to form a second pixel, wherein the incident angle $\theta1$, an incident angle $\theta1'$ at which the laser beam incident at the incident angle $\theta1$ on the light sensitive material is incident in the light sensitive material, the incident angle $\theta2$, an incident angle $\theta2'$ at which the laser beam incident at the incident angle $\theta2$ on the light sensitive material is incident in the light sensitive material, and one of integers N satisfy the following formula:

$$(N+0.5-(0.7/\gamma))<(2nh/\lambda)(\cos\theta1'-\cos\theta2')<(N+0.5+(0.7/\gamma))$$

where, n denotes a refractive index of the light sensitive material, h denotes a thickness of the light sensitive material, $\lambda$ denotes a wavelength of the laser beam and $\gamma$ is a gamma value of the light sensitive material.

22. The image recording method of claim 21, wherein the first pixel neighbors the second pixel.

23. The image recording method of claim 21, further comprising the step of:
scanning the light sensitive material with the laser beam being incident at the incident angle $\theta1$ and the laser beam being incident at the incident angle $\theta2$ in a main scanning direction, where the laser beam being incident at the incident angle $\theta1$ scans along a scanning line substantially different from that along which the laser beam being incident at the incident angle $\theta2$ scans.

24. The image recording method of claim 21, wherein the light sensitive material comprises a support having a thickness of 200 $\mu$m or less and a light sensitive layer provided on the support and containing an organic acid silver salt and silver halide particles having an average particle size of 0.1 $\mu$m or less and wherein the light sensitive material has the gamma value $\gamma$ of 2 or more and a light transmission ratio of 20% or more for a laser beam having an average wavelength.

25. An image recording method, comprising steps of:
emitting plural laser beams to be incident at different incident angles $\theta1$ and $\theta2$ onto a light sensitive material, and scanning the light sensitive material with the plural laser beams in a main scanning direction, wherein the incident angle $\theta1$, an incident angle $\theta1'$ at which the laser beam incident at the incident angle $\theta1$ on the light sensitive material is incident in the light sensitive material, the incident angle $\theta2$, an incident angle $\theta2'$ at which the laser beam incident at the incident angle $\theta2$ on the light sensitive material is incident in the light sensitive material, and one of integers N satisfy the following formula:

$$(N+0.5-(0.7/\gamma))<(2nh/\lambda)(\cos\theta1'-\cos\theta2')<(N+0.5+(0.7/\gamma))$$

where, n denotes a refractive index of the light sensitive material, h denotes a thickness of the light sensitive material, $\lambda$ denotes a wavelength of the laser beam and $\gamma$ is a gamma value of the light sensitive material.

26. The image recording method of claim 25, further comprising the step of:
splitting a laser beam into plural laser beams, wherein in the emitting step, the split plural laser beams are incident at the different incident angles on the same pixel on the light sensitive material.

27. The image recording method of claim 25, further comprising the step of:
splitting a laser beam into plural laser beams, wherein in the emitting step, the split plural laser beams are incident at the different incident angles on neighboring pixels on the light sensitive material.

28. The image recording method of claim 25, wherein the light sensitive material comprises a support having a thickness of 200 $\mu$m or less and a light sensitive layer provided on the support and containing an organic acid silver salt and silver halide particles having an average particle size of 0.1 $\mu$m or less and wherein the light sensitive material has the gamma value $\gamma$ of 2 or more and a light transmission ratio of 20% or more for a laser beam having an average wavelength.

29. An image recording apparatus, comprising:
a laser beam source to emit a laser beam, and incident angle changing means for changing an incident angle, in a sub scanning direction, of the laser beam emitted from the laser beam source onto a light sensitive material, wherein a gamma value $\gamma$ of the light sensitive material is not smaller than 2, wherein the light sensitive material comprises a support having a thickness of 200 $\mu$m or less and a light sensitive layer provided on the support and containing an organic acid silver salt and silver halide particles having an average particle size of 0.1 $\mu$m or less and wherein the light sensitive material has a light transmission ratio of 20% or more for a laser beam having an average wavelength, and wherein the light sensitive material contains the organic acid silver salt four times greater in terms of an amount of silver than the silver halide particles in the light sensitive layer.

30. An image recording apparatus, comprising:
a laser beam source to emit plural laser beams, and an optical system for changing an incident angle, in a sub scanning direction, of at least one of the plural laser beams emitted from the laser beam source onto a light sensitive material, wherein a gamma value γ of the light sensitive material is not smaller than 2, wherein the light sensitive material comprises a support having a thickness of 200 μm or less and a light sensitive layer provided on the support and containing an organic acid silver salt and silver halide particles having an average particle size of 0.1 μm or less and wherein the light sensitive material has a light transmission ratio of 20% or more for a laser beam having an average wavelength, and wherein the light sensitive material contains the organic acid silver salt four times greater in terms of an amount of silver than the silver halide particles in the light sensitive layer.

* * * * *